United States Patent [19]
Palmer et al.

[11] Patent Number: 5,791,073
[45] Date of Patent: Aug. 11, 1998

[54] VACUUM EXCAVATION SYSTEM

[75] Inventors: Michael G. Palmer, Easton; Richard M. Saroney, Stroudsburg, both of Pa.

[73] Assignee: Filtration Manufacturing, Inc., Portland, Pa.

[21] Appl. No.: 748,018

[22] Filed: Nov. 12, 1996

[51] Int. Cl.⁶ .................................................. B65G 53/14
[52] U.S. Cl. ......................... 37/317; 222/202; 406/173
[58] Field of Search ............................ 37/317, 347, 320, 37/321, 466; 169/28, 52, 69; 220/420, 425, 454; 222/202; 406/173

[56] References Cited

U.S. PATENT DOCUMENTS

| | | | |
|---|---|---|---|
| 5,201,877 | 4/1993 | Relin et al. | 37/317 X |
| 5,295,317 | 3/1994 | Perrott | 37/347 X |
| 5,299,370 | 4/1994 | Gyori et al. | 37/347 |
| 5,408,766 | 4/1995 | Pobihushchy | 37/347 X |
| 5,487,228 | 1/1996 | Marazzo et al. | |
| 5,487,229 | 1/1996 | Nathenson et al. | 37/347 |
| 5,573,067 | 11/1996 | Fiterson | 169/52 |

Primary Examiner—Michael J. Carone
Assistant Examiner—Robert Pezzuto
Attorney, Agent, or Firm—Paul & Paul

[57] ABSTRACT

A vacuum excavation system is provided in which a vacuum is generated for withdrawing dirt, water or other material from a vacuum excavation site, and whereby such material is delivered to a containment structure, preferably of the hopper type having a discharge. A valve is provided for the vacuum, such that actuation of the valve interrupts the vacuum, whereby material pickup may be discontinued and/or material may be discharged from the containment structure. Preferably the vacuum-controlling valve exists in a conduit between the situs of vacuum generation and a containment structure. The valve will preferably be controlled by a pneumatic/electrical control for operation of the same.

The excavation system is preferably vehicle-mounted, with the same motor that drives the vehicle also driving an air compressor for operating a pneumatic tool as well as driving the vacuum generator.

18 Claims, 4 Drawing Sheets

VACUUM EXCAVATION SYSTEM

BACKGROUND OF THE INVENTION

Vacuum excavation systems are known in the art of excavation. Particularly, for many years utility companies and contractors have used vacuum excavation technology for accessing underground utility lines, such as gas lines, water lines, electric lines, sewer lines, etc. For most of those many years, the technology has experienced problems resultant from the material being handled. For example, clogged hoppers, poor filtration, inefficient dirt handling, equipment failure—often as a result of contamination by the dirt or other material being handled—, and particularly the inability to handle water that may seep in the hole in the earth that is being evacuated, have plagued the art of vacuum excavation.

Often, the material being handled has included mud, which has given existing equipment particular problems. Often, existing equipment has relied upon pumps as distinguished from other vacuum excavation equipment, in order to remove water from holes that are being excavated.

In the course of vacuum excavation, it is desirable to deliver the dirt or other material being excavated, into a containment structure, and to periodically release such dirt or other material from the containment structure, back onto the ground, eventually to re-fill the excavation hole. While control of the material containment structure has, in the past, sometimes been a problem, that problem has been addressed successfully in the system disclosed in U.S. Pat. No. 5,487,228, the complete disclosure of which is herein incorporated by reference.

In addition to the contribution of the above U.S. Pat. No. 5,487,228, other problems remain in the art of vacuum excavation, some of which are addressed herein.

SUMMARY OF INVENTION

The present invention is addressed to providing a vacuum excavation system whereby vacuum control of conduits and material containment structure may readily be interrupted to discontinue pickup of material from a material pickup site, and/or effect dropping of material present in a containment structure. Such discontinuance is caused by the use of a valve, which preferably is controlled by a combination of pneumatic and electric controls, for rapid interruption of the vacuum that handles the material pickup.

Additionally, a system is provided which is vehicle-mounted, whereby the same motor that drives the vehicle also functions to provide a means for providing air pressure for operating a pneumatic tool, as well as a means for generating the material pickup vacuum. The material pickup vacuum may be provided with a ready vacuum interruption means in the form of a valve and valve operator, for efficiently interrupting the vacuum which provides the material pickup.

Accordingly, it is a primary object of this invention to provide a novel vacuum excavation system for handling dirt, water or other materials.

It is a further object of this invention to accomplish the above object, wherein the vacuum excavation system is provided with a means for readily and rapidly interrupting the vacuum of the system, for rapid discontinuance of material pickup by interruption of the vacuum.

It is a further object of this invention to interrupt the vacuum as set forth in the objects above, by a means of a combination pneumatic-electrical valve operator.

It is a further object of this invention to provide a vehicle-mounted excavation system, in which the motor that drives the vehicle also provides the means for driving an air compressor for operating a pneumatic tool, as well as the means for generating the vacuum for enabling the material pickup from a material pickup site.

Other objects and advantages of the present invention will be readily understood upon a reading of the following brief descriptions of the drawing figures, the detailed descriptions of the preferred embodiments, and the appended claims.

BRIEF DESCRIPTIONS OF THE DRAWINGS

DETAILED DESCRIPTIONS OF THE PREFERRED EMBODIMENTS

Figure 1:
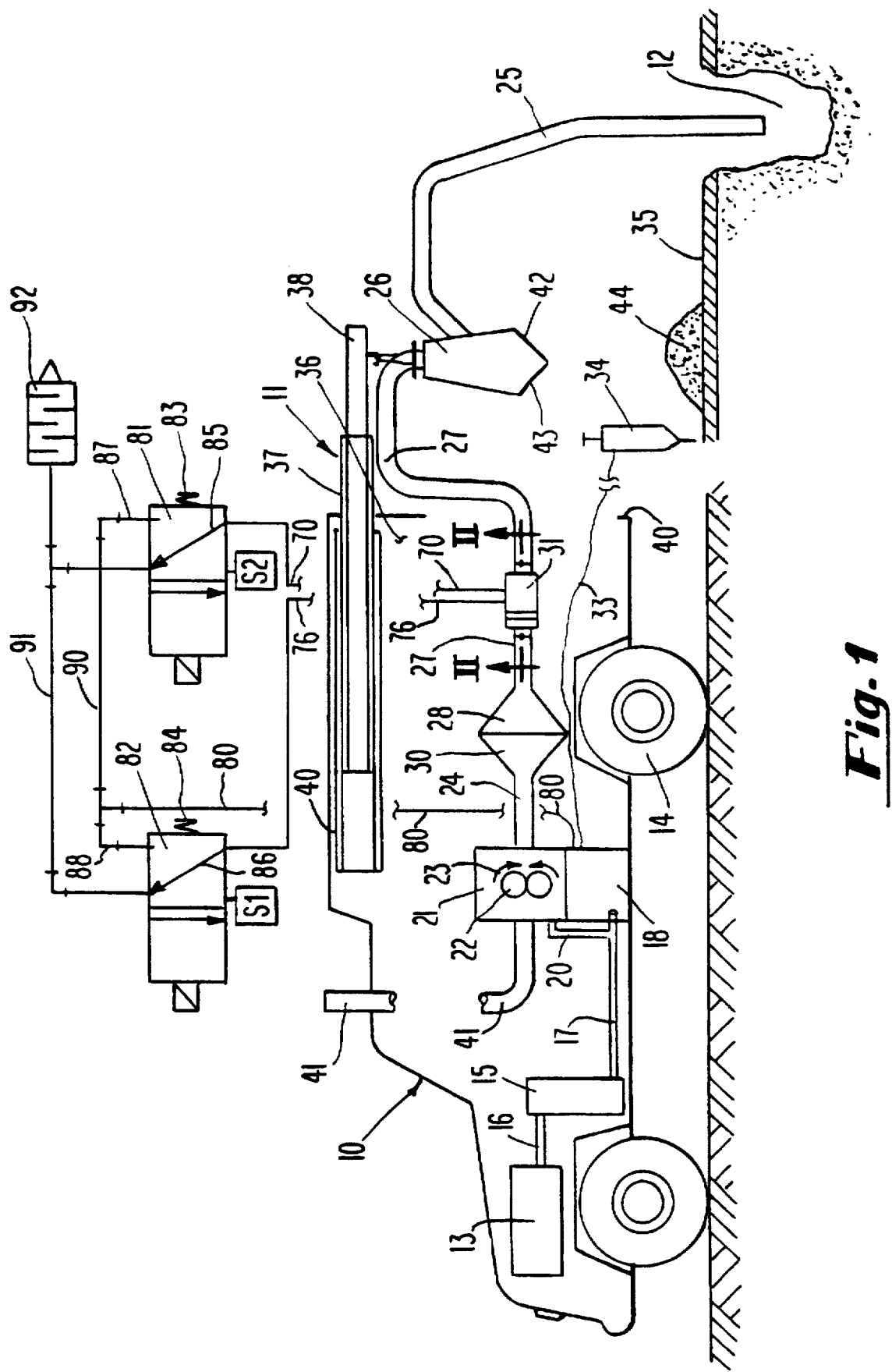
FIG. 1 is a schematic side elevational view of a vehicle-mounted vacuum excavation system and valve operator, in accordance with this invention.

Referring now to the drawings in detail, reference is first made to FIG. 1, where it will be seen that a vehicle-mounted excavation system is provided in a truck 10, in which the excavation system, generally designated by the numeral 11, may be delivered to an excavation site 12.

The truck 10 is provided with a suitable motor 13, for conventionally driving wheels, such as those 14 from a transmission, such as 15, via shaft 16 and a driveshaft (not shown) connecting the transmission 15 to a drive for the wheels 14, in a conventional manner.

The transmission 15 also drives a driveshaft 17 for operating a compressor 18, and additionally drives a driverod 20 which, in turn provides power for operating a vacuum generation means 21. The vacuum generation means 21 may include a pair of opposed rotating gear-like members, oppositely driven as in the direction of the arrows 23, to generate a vacuum in line 24 that provides a sufficient vacuum source to pick up dirt, water, and other material from the excavation site 12, to draw the same into a preferably flexible conduit 25, up into a material containment structure 26, which, in turn, is provided with a vacuum draw via conduit 27 that is connected to conduit 24 at filter housing 28. Within filter housing 28 appropriate filter means 30 are located, for preventing the passage of dirt, water, and other material, into the vacuum generation means 21.

Located on conduit 27 is a vacuum control valve 31.

The compressed air compressor 18 provides compressed air via line 33, for operating a pneumatic drill or similar tool 34, for breaking up the surface 35 of a roadway or the like, for accessing dirt, water or other material in the access site 12.

The vacuum excavation system is also provided with a means for removing portions of the system out of the body 36 of the truck 10. The system can thereby include telescopic sections 37,38 disposed within a mounting sleeve 40 that, in turn, is fixedly mounted in the truck by means not shown, whereby the telescopic sections 37,38 may move rightwardly outwardly as shown in FIG. 1 for disposing a material containment structure 26 outwardly of the back 40 of the truck, such that the conduit 25 may reach a vacuum excavation site 12, as shown.

Air drawn through the filter 30 into the vacuum generation means 21 can exit to atmosphere via exit line 41.

The material containment structure 26 may be constructed as shown in U.S. Pat. No. 5,487,228, or by other means, but generally will receive dirt, water, or other material via conduit 25, for collection therein, and for periodic discharge from the lower end thereof, past flapper doors 42,43, pivotly mounted to separate and define an opening therebetween, whereby dirt may be discharged to fall onto a surface, as at 44, for eventual re-use in re-filling the hole of excavation site 12. Similarly, rocks and other large debris collected within the material containment structure 26 may be desired to be occasionally discharged from the unit 26, and to this end it may occasionally be desired to open the flapper doors 42,43, which flapper doors are generally held in the closed position illustrated in FIG. 1, by means of the continually drawn vacuum at the upper end of the material containment structure 26, as drawn via conduit 27.

Accordingly, for interruption of the vacuum draw at conduit 27, to discontinue drawing dirt, water or material into the conduit 25, and/or, for interruption of the containment of dirt or other material within the material containment structure 26, the valve 31 may be actuated.

Figure 2:
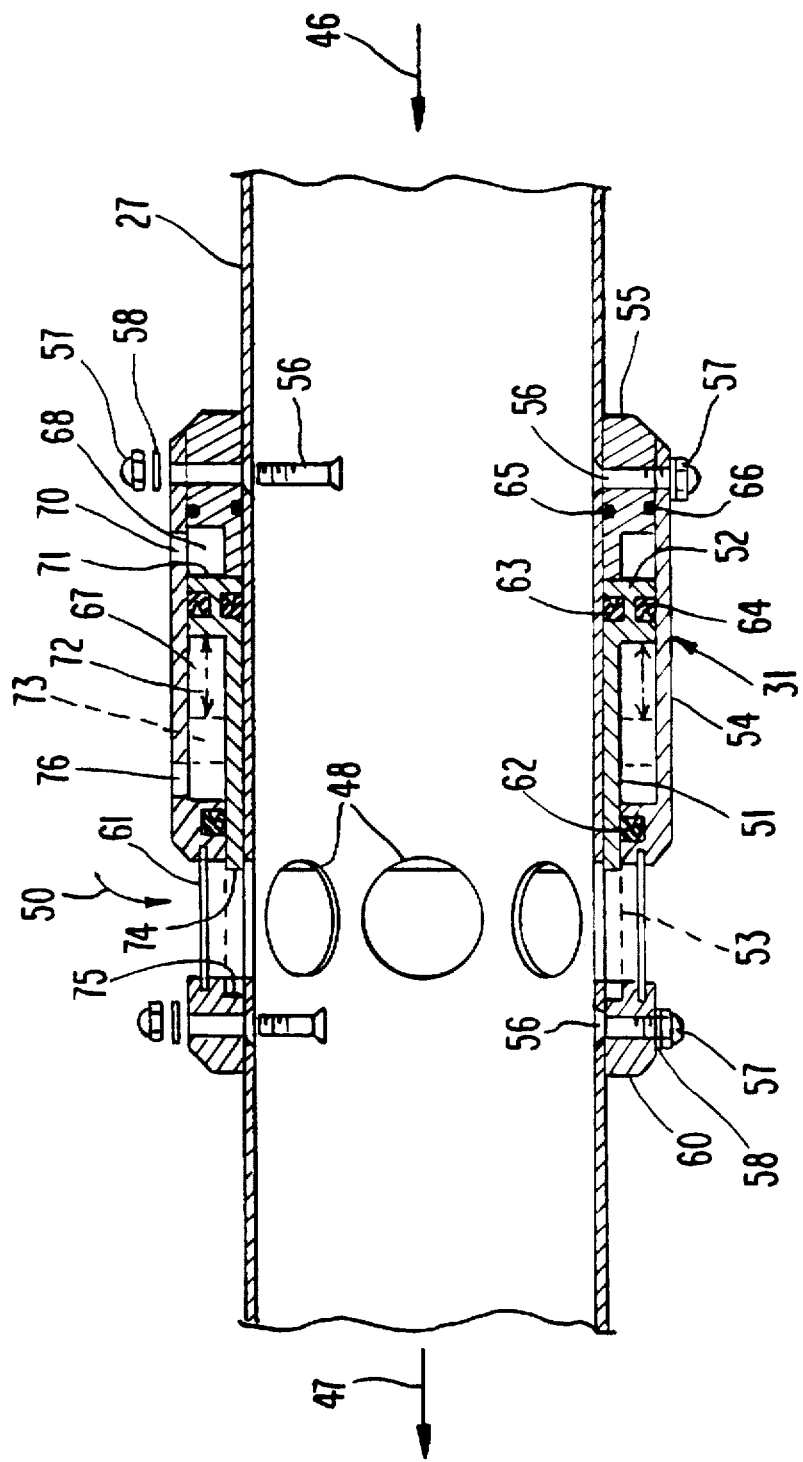
FIG. 2 is a longitudinal sectional view of a conduit-mounted valve for discontinuing the vacuum draw through the excavation system of FIG. 1, taken generally along the line II—II of FIG. 1.

With reference now to FIG. 2, it will be seen that the valve 31 is provided to draw a vacuum in conduit 27, in the direction of the arrow 46 and to discharge air drawn through the conduit 27, in the direction of the arrow 47. In the periphery of the conduit 27 there are provided a plurality of generally equidistantly circumferentially spaced ports 48 that, in the open position of the valve shown in FIG. 2, allow for atmospheric air to enter the ports or conduit means 48 in the direction of the arrow 50, to discontinue the draw of vacuum through the right end of the valve as shown in FIG. 2, at arrow 46.

The valve operation is provided by means of a cylindrical valve member 51 having a peripheral piston 52 carried thereby, for movement of the valve member 51 between the full line position therefor shown in FIG. 2, to the phantom line position 53 shown therefor, in which phantom position the valve member 51 covers the ports 48 in the conduit 27, thereby shutting-off the ports 48 from access to atmosphere, and thereby discontinuing the vacuum draw of air from atmosphere at the arrow 50.

The valve member 51 is housed within a cylindrical housing 54 that, in turn, is fastened to the conduit 27 by means of a fastener ring 55 by means of suitable fastener screws 56 and nuts 57 and washers 58. The left end of the mounting sleeve 54 is connected to a mounting ring 60 that, in turn, is carried by the conduit 27 also by suitable fasteners 56,57,58, and which also mount a suitable safety screen 61 that separates the mounting rings 60 and 54, as shown. Suitable cup seals are provided at 62,63,64, to prevent undesirable leakage of compressed air when the valve is operated, and suitable O-ring seals 65,66 are likewise are provided, for the same purpose.

It will thus be seen that a forward pressure chamber is provided at 67, and rearward pressure chamber at 68. When compressed air is allowed to enter the rear chamber 68 via inlet 70, the compressed air provides a force against the right surface 71 of the piston 52, driving the same leftward from the full line position shown in FIG. 1 an amount represented by the double headed arrow line 72, such that the piston 54 moves to the phantom position therefor illustrated at 73, and the forward end 74 of the valve sleeve member 51 moves against the cylindrical recessed surface 75, to a full closed position whereby the ports 48 are covered. It will also be seen that the screen 61 provides a safety screen over the ports 48.

When it is desired to open the valve 31, air pressure is provided via line 76 to the forward pressure chamber 67, and the piston 52 is thus acted upon in a reverse manner to be moved from the phantom line position illustrated in FIG. 2, back to full line position therefor illustrated in FIG. 2, in which position atmospheric air is able to enter the conduits or ports 48 in the direction of the arrow 50, whereby the valve 31 will no longer effectively draw air through the right end of the conduit in the manner of the arrow 46.

Thus, in the position of the valve 31 illustrated in FIG. 2, the valve is vented via ports 48.

With reference again to FIG. 1, it will be seen that the compressed air lines 70,76 correspond with the openings 70,76 of FIG. 2.

It will also be seen that the compressor 18 feeds a compressed air line 80 for delivering compressed air to pneumatic valves 81,82, each of which are spring-return valves, via springs 83,84.

When either of the solenoids S1 or S2 is electrically actuated by means which will be described hereafter, the pneumatic valves 81,82 will be actuated such that lines 85,86 will communicate with compressed air lines 87,88, that are, in turn, fed by header 90 that, in turn, is fed by compressed air line 80, for rapid, momentary operation of valve 81,82, for re-positioning the piston 52 and valve operating sleeve member 51 of valve 31, after which a pneumatic valve 81,82 will return via spring force 83,84 to their positions illustrated in FIG. 1, in which the lines 85,86 are vented to atmosphere via line 91 and muffler 92.

Figure 3:
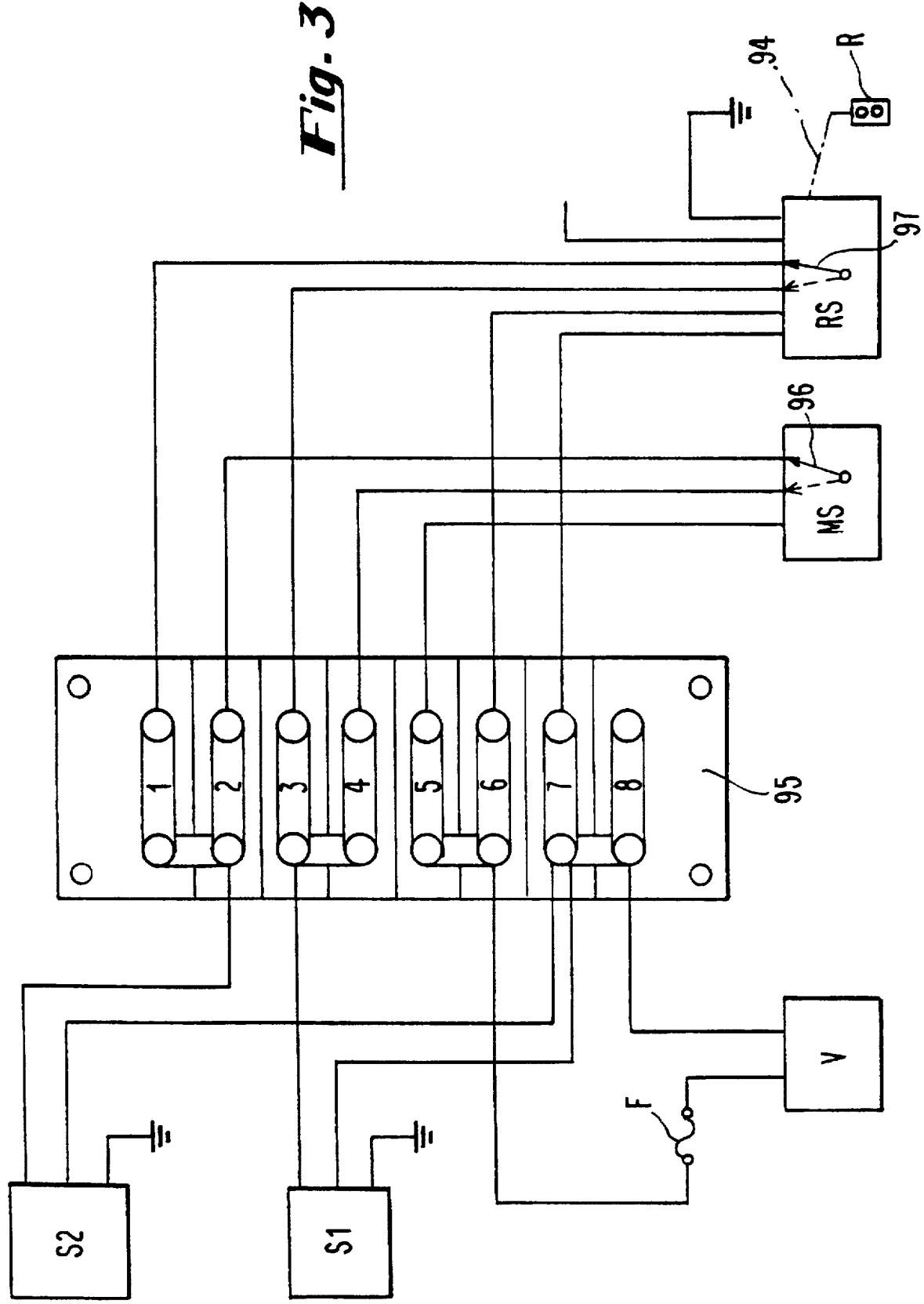
FIG. 3 is an electrical schematic for operating solenoid valves shown in FIG. 1, that in turn, control the vacuum-controlling valve of FIG. 1.

With reference to FIG. 3, now, it will be understood that either of the solenoids S1,S2, may be actuated be means of either the manual switch MS or the radio switch RS, the latter of which, in turn, is operated by means of a Remote operating via radio frequency (RF) at 94.

A source of power V provides a suitable voltage, with the system being protected by a suitable fuse F. On a terminal block or strip 95 is a series of eight terminals which are either manually controlled via manual switch MS, or radio controlled via radio switch RS. The manual switch MS is operated at 96, such that either terminal 2 or 4 is used to complete the circuit, but not both, so that only one of normally closed solenoids Si,S2 is operated at a given at time. Similarly, radio switch RS is operated at 97, such that only one of terminals 1,3 is used to complete the circuit at a given time, for opening only one of solenoids S1,S2, at a given time, if radio actuation is being utilized.

Preferably, the radio control is a three channel transmitter and receiver, with the receiver controlling internal relay contacts which perform the same functions as the manual switch MS. The relays are momentary and are energized only when the transmitter key is pressed and held, either by the manual switch MS, or on the remote R.

It will thus be seen that by virtue of the pneumatic schematic illustrated in FIG. 1 and its electrical control as illustrated in FIG. 3, the valve 31 of FIG. 2 can be operated to effect an automatic dump from the hopper or material containment apparatus 26, for effectively and efficiently controlling the discontinuance of pickup of material into conduit 25, as well as the dumping of material from the containment structure 26. It will also be seen that the motor 13 which controls the movement of the vehicle 10 also operates to provide power for driving the air compressor 18, as well as to provide power for operation of the vacuum generation means 21 and to provide compressed air via line 80 for controlling the pneumatic/electrical valve operator.

Figure 4:
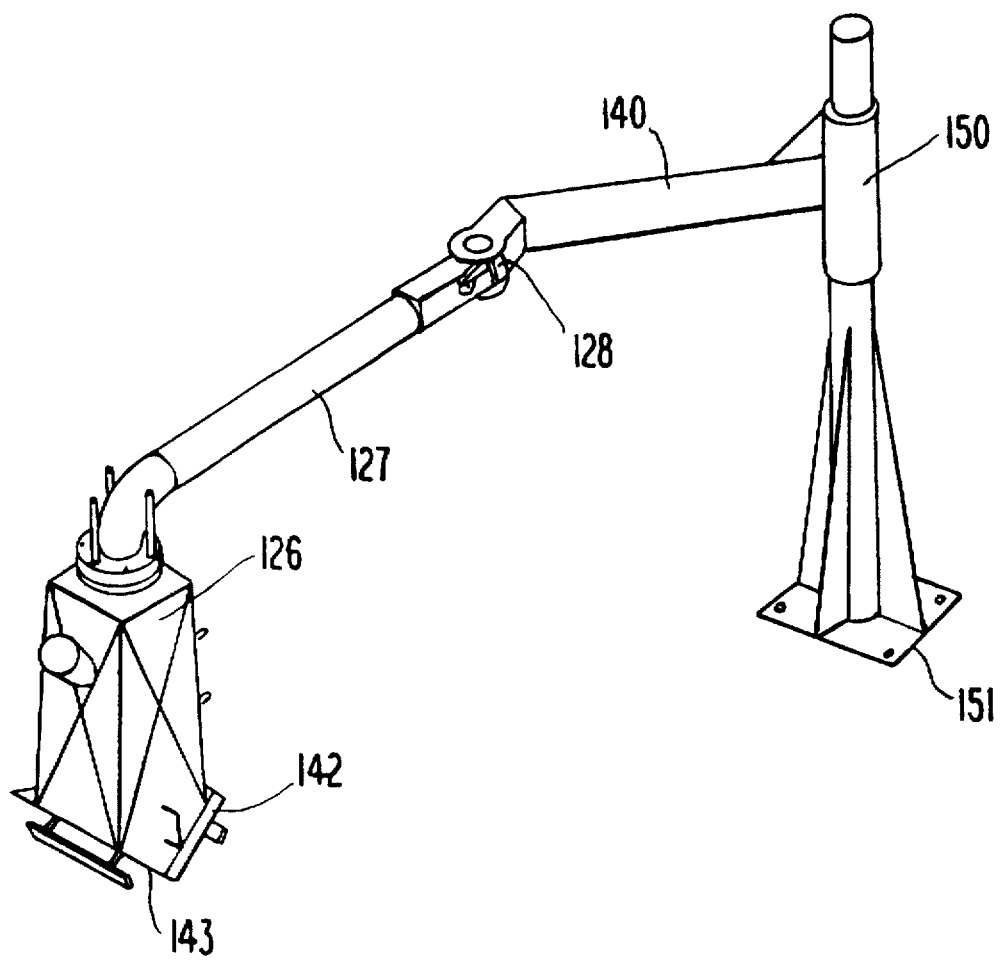
FIG. 4 is a perspective view of an alternative, but preferred, means for mounting a material containment means in a vehicle, for articulation of the material containment means as it moves from inside the vehicle, to outside the vehicle.

With reference now to FIG. 4, it will be seen that the material containment structure 126 with its flapper doors 142,143, is provided with vacuum via a conduit 127, which also holds the hopper or containment structure 126 during use, with the conduit 127, in turn, being carried by a yoke 128, that, in turn is mounted via a sleeve 140 carried on a vertical post 150 that is floor-mounted in the vehicle at 151. Thus, the arrangement of FIG. 4 provides an alternative means for articulating the motion of the material containment structure 126 into and out of the back of the vehicle, while also providing a means for delivering vacuum to the containment structure 126, as shown.

It will be apparent from the foregoing that various modifications may be made in the arrangement, assembly, and use and operation of the apparatus and system of this invention, all within the spirit and scope of the invention as defined in the appended claims.

We claim:

1. A vacuum excavation system for handling dirt, water or other materials, comprising:
   (a) vacuum generation means for generating sufficient vacuum for vacuum pickup of material from a material site;
   (b) material containment means having a top and a bottom, for receiving and containing materials picked up from a material pickup site at the bottom of said material containment means in response to vacuum drawn thereon by said vacuum generation means;
   (c) first conduit means, comprising a conduit for vacuum, located upstream of said vacuum generation means, connecting said vacuum generation means and the top of said material containment means, for providing sufficient vacuum for material pickup between said vacuum generation means and said material containment means;
   (d) second conduit means, comprising a conduit for vacuum and material, for connecting said material containment means to the material pickup site for providing sufficient vacuum for material pickup between said material containment means and the material pickup site and for delivering material to the bottom of the material containment means;
   (e) valve means located in at least one of said first conduit means and the top of said material containment means; said valve means being normally closed to allow vacuum from said vacuum generation means to draw a vacuum in said first conduit means and the top of said material containment means and to draw a vacuum and material in said second conduit and to the bottom of said material containment means; said valve means having third conduit means optionally openable to atmosphere; with opener means being provided for said valve means for selectively opening said valve means to atmosphere to allow atmospheric air to enter said first conduit and the top of said material containment means, to at least substantially reduce the vacuum draw upstream of said valve means.

2. The system of claim 1, wherein said valve means comprises means, when opened, for discontinuing the pickup of material from a material pickup site.

3. The system of claim 1, wherein said material containment means includes vacuum-responsive material discharge means; said discharge means being normally closed when a vacuum is drawn on said material containment means and being opened when said vacuum therein is at least substantially reduced; and wherein said valve means comprises means for operating said material discharge means.

4. The system of claim 1, wherein said valve means is located in said first conduit means.

5. The system of claim 1, wherein said valve means comprises a valve member movable between a normally closed first position in which said third conduit means is closed and an open second position in which said third conduit means is at least substantially open.

6. The system of claim 5, including a valve operator for said valve means; said valve operator being of a pneumatic type.

7. The system of claim 6, including electrical means for operating said valve operator.

8. The system of claim 5, including electrical means for controlling said valve.

9. The system of claim 8, wherein said electrical means includes solenoid valve means.

10. The system of claim 8, wherein said electrical means includes manual switch means for providing an electric signal to said electrical means, for controlling the valve.

11. The system of claim 8, wherein said electrical means includes a remote electrical switch means for providing an electric signal to said electrical means, for controlling the valve.

12. The system of claim 11, wherein said electrical means includes an RF signal transmitter and receiver.

13. The system of claim 1, including filter means in said first conduit means, for filtering material being handled from reaching said vacuum generation means.

14. The system of claim 5, wherein said valve member includes a slide member, and wherein said third conduit means includes ports openable to atmosphere.

15. The system of claim 1, wherein said system is vehicle-mounted for portability with the vehicle.

16. The system of claim 1, wherein said valve means comprises means, when opened, for discontinuing the pickup of material from a material pickup site, wherein said material containment means includes vacuum-responsive material discharge means; said discharge means being normally closed when a vacuum is drawn on said material containment means and being opened when said vacuum therein is at least substantially reduced; and wherein said valve means comprises means for operating said material discharge means, wherein said valve means is located in said first conduit means, wherein said valve means comprises a valve member movable between a normally closed first position in which said third conduit means is closed and an open second position in which said third conduit means is at least substantially open, wherein said valve member includes a slide member, and wherein said third conduit means includes ports openable to atmosphere, including a valve operator for said valve means; said valve operator being of a pneumatic type, including electrical means for controlling said valve, wherein said electrical means includes solenoid valve means, wherein said electrical means includes a remote electrical switch means for providing an electrical signal to said electrical means, for controlling the valve, wherein said electrical means includes an RF signal transmitter and receiver, including filter means in said first conduit means, for filtering material being handled from reaching said vacuum generation means, and wherein said system is vehicle-mounted for portability with the vehicle.

17. A vehicle-mounted excavation system for excavation of dirt, water or other materials, comprising:

(a) a motor-driven vehicle;

(b) a motor carried by the vehicle for driving the vehicle;

(c) vacuum generation means carried by the vehicle for generating sufficient vacuum for pickup of material from a material pickup site;

(d) first conduit means for connecting said vacuum generation means to the material pickup site;

(e) air compressor means carried by the vehicle for providing compressed air for operating a pneumatic tool;

(f) second conduit means for connecting said compressor means to a pneumatic tool; and (g) means operatively connecting said motor with said vacuum generation means and said air compressor means, for driving both said vacuum generation means and said air compressor means from said vehicle motor.

18. The system of claim 17, including material containment means for receiving and containing materials picked up from the material pickup site in response to vacuum drawn thereon by said vacuum generation means, including valve means for controlling the drawing of vacuum on said material containment means, and pneumatic means for operating said valve means with compressed air from said air compressor means.

* * * * *

UNITED STATES PATENT AND TRADEMARK OFFICE
CERTIFICATE OF CORRECTION

PATENT NO. : 5,791,073

DATED : August 11, 1998

INVENTOR(S) : Michael G. Palmer and Richard M. Saroney

It is certified that error appears in the above-identified patent and that said Letters Patent is hereby corrected as shown below:

Column 4, line 53, "Si" should read "S1".

Signed and Sealed this

Twentieth Day of October, 1998

Attest:

BRUCE LEHMAN

Attesting Officer     Commissioner of Patents and Trademarks